Feb. 2, 1943.         H. W. KELLY         2,309,648
POWER TRANSMISSION BELT
Filed Oct. 1, 1941
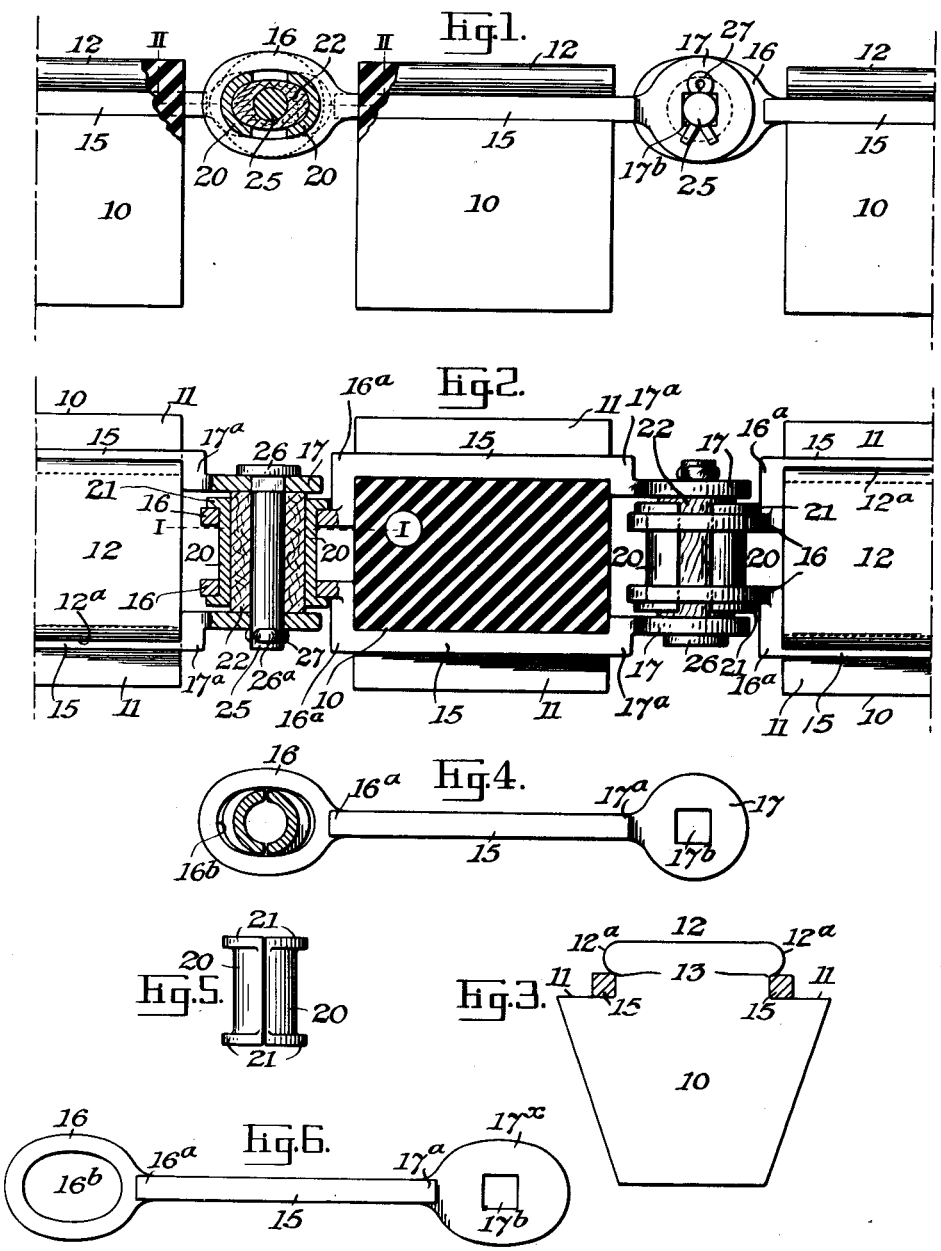
Hugh Williamson Kelly,
Inventor:
by Murray C. Boyer
Atty.

Patented Feb. 2, 1943

2,309,648

UNITED STATES PATENT OFFICE 2,309,648

POWER TRANSMISSION BELT

Hugh Williamson Kelly, Woodbridge, N. J., assignor to Sarah Eleanor Westergaard, Rahway, N. J.

Application October 1, 1941, Serial No. 413,200

5 Claims. (Cl. 74—236)

My present invention relates to power transmission belts and is a continuation in part of my application for patent filed September 26, 1940, Serial No. 358,505.

One object of my invention is to provide an improved type of belt comprising an endless carrier or support made up of pivotally connected links which are arranged to form frames, and a series of unit elements or blocks of friction material, substantially wedge or V-shape in contour, detachably mounted in the frames provided by the links of such endless carrier in such manner as to facilitate construction and permit renewal or replacement in the event of damage or wear.

My invention is directed to that type of power transmission belts in which unit sections or blocks of friction material substantially wedge-shape in end elevation and rectangular in side elevation and plan, are associated with an endless carrier made up of frames composed of pivotally connected links. These pivotally connected links are so mounted or arranged as to provide between them substantially rectangular spaces in which the unit elements or blocks of friction material are received; such elements or blocks being so constructed as to be supportable by and suspended from the links of the endless carrier in what may be termed a balanced condition. The upper portion of the improved unit element or block of friction material which I employ in the construction of my improved belt is provided with a boss or projection providing shoulders which extend lengthwise of the block or unit element and inwardly of its greatest width whereby it may be supported by and suspended from the links which make up the frames receiving said blocks; such shoulders being disposed above the central plane of the friction blocks and in parallel relation.

The type of friction block which I employ is fully set forth in my pending application before referred to.

Specifically, my invention includes the employment of separate, integral blocks of friction material—substantially of wedge- or V-shape—and the detachable mounting of the same in supporting frames made up of links which underlie the shoulders of the blocks, with the ends of said links pivotally connected in a special manner whereby they are caused to clamp the blocks between them and maintain their position beneath the shouldered portions of said blocks. It will be understood of course that the links and their pivotal connections are so associated with the blocks as to insure that such connections shall not prevent proper engagement of their lateral beveled surfaces with the beveled walls of the pulley grooves.

The links making up the frames in which the unit elements or blocks are received are offset inwardly at their pivotal connections thereby providing shoulders which serve to maintain the blocks in the separated and desirably spaced relation.

The pivotal connections for the ends of the links include shouldered members which engage each pair of links at one end of the same, and such members are held in their engaging position by means of an inserted friction bearing member. Through this bearing member the pivot pin passes; such pin having at one end a head which engages one of the links, while its opposite end receives a cotter pin or other connection to engage the link on the other side. The pin binds the ends of the links into engagement with the ends of the friction bearing member which ends project a slight distance beyond the shouldered members. It will be seen therefore that the links at one end are clamped by the shouldered member and at the other end by the pivot pin, and that both sets of links rock on the pivot pin which in turn rocks in the friction bearing member.

These and other features of my invention are more fully set forth hereinafter; reference being had to the accompanying drawing, more or less diagrammatic in character, in which:

Figure 1 is a side elevation of a form of power transmission belt within the scope of my present invention; partly in section on the line I—I, Fig. 2.

Fig. 2 is a plan view of the belt, partly in section on the line II—II, Fig. 1.

Fig. 3 is an end elevation of one of the friction blocks; the supporting links underlying the shouldered bosses or projections being shown in section.

Fig. 4 is a detached view of one of the links employed to form the carrying means for the friction blocks.

Fig. 5 is a view illustrating a form of slit sleeve cooperating with one end of each link to hold the same in clamping position with respect to the friction blocks, and Fig. 6 is a side elevation of a slightly modified form of link.

In this form of my invention I provide independent links of similar construction which are arranged to engage the bosses or projections of the friction blocks or unit elements. These links may be in the form of pressed metal sections, castings, or drop forgings. They are offset at each end to provide apertured ears; the offset portions at one end being less in width than the other offset portions at the opposite end of the links so that in placing them in operative position, one pair of the apertured ears is embraced by the other pair, and the friction blocks or unit elements are mounted in the rectangular spaces defined by the straight portions of the links and the offset portions thereof; such straight portions underlying the shoulders of the bosses or projections at the top of the friction blocks or unit elements. The apertured ears of the respective links are pivotally connected by pins or bolts which pass through the same and through sleeves of suitable antifriction material such as wood, fibre, or the like. The ears at one end of the respective links are preferably oval, with oval apertures, while those at the opposite ends are circular with squared apertures, as hereinafter described.

In carrying out my present invention I provide friction blocks or unit elements 10, of the same general character as those disclosed in my pending application before referred to; such unit elements or blocks being shown in side elevation in Fig. 1, in plan in Fig. 2, and in end elevation in Fig. 3.

Like the blocks shown in my pending application, the present blocks are substantially V- or wedge-shape in end elevation; are shouldered at 11, at their greatest width, and have bosses or projections 12 centrally of the upper portion of their body above and inwardly of their greatest with rounded edges 12a, and such projections or bosses are undercut or grooved lengthwise of the same, as at 13, for the reception of the links of the supporting carrier.

The links, which are of like form or construction; a side elevation of one being shown in Fig. 4, have straight portions 15 lengthwise of the same which lie in parallel relation when assembled, with apertured ears 16 and 17, which are displaced inwardly of the straight portions to provide the shouldered portions 16a and 17a; the latter being of less extent than the former.

The shouldered portions 16a terminate in oval ears 16, with oval apertures 16b, and the shouldered portions 17a terminate in circular ears 17, with squared apertures 17b. The shouldered portions 16a of the links being wider than the shouldered portions 17a, the apertured ears 16 lie between the ears 17 when they are in their assembled position, and said ears 16 are held in a clamping position with respect to the blocks or unit elements 10 by means of sections 20 of a split sleeve which, when placed together in the position indicated in Fig. 4, may pass into the oval apertures 16b, and then be spread or displaced outwardly so that the shoulders 21 of the same may rest against the surface of the oval ears, as indicated in Fig. 2. This split sleeve with its shouldered portions in the engaging position is held by the oval sleeve of bearing material, wood, fibre, or the like, as clearly indicated in Fig. 2. If desired, both ends of the links may terminate in oval ears, as illustrated in Fig. 6; the ear with the squared aperture being indicated at 17x.

When the ends of a pair of links are disposed in the manner just described, the straight portions 15 of the same are clamped against the shouldered bosses or projections 12 of the friction blocks or unit elements 10. The ears 17 of the adjacent pair of links are then placed against the ends of the anti-friction sleeve 22, whose ends preferably project a slight distance beyond the shouldered portions of the split sleeve 20, and then a pin or bolt 25 is set in place; such pin or bolt having a squared portion 25a to fit the squared opening or aperture in one of the ears 17. The pin or bolt may have a head 26 bearing against the ear 17, while its opposite end may be apertured at 26a for the reception of a cotter or split pin 27, which holds the same in proper position with respect to the respective sets of links. The bolts 25 may be disposed in staggered relation with the heads of the same alternately on opposite sides of the links making up the belt, as illustrated in Fig. 2. In lieu of this, the end of the pin or bolt may be threaded to receive a nut, and in some instances it may be desirable to rivet the end against the link ear.

It will be seen therefore that the eared ends of the links of each pair are clamped at one end by the shouldered split sleeve 20, while at their opposite ends they are clamped by the pin or bolt. By reason of the squared portion of the bolt, the latter is held against turning and must rock in the oval block 22 of anti-friction material, and in turn the oval sleeve or block of anti-friction material rocks on the pivot pin or bolt; thus providing an anti-friction bearing of the pivotal connections since there are no metal parts in rocking engagement.

While I have described and shown with more or less particularity certain details of construction embodying my invention, it will be understood that such disclosure is illustrative only and not in any limiting sense and that modifications may be made therein without departing from the spirit of my invention; all of which is deemed to be within the scope of the appended claims.

I claim:

1. A power transmission belt comprising links with apertured end ears arranged in pairs and providing between them a substantially rectangular space, a wedge-shaped friction element of rectangular contour in plan detachably supported by said pairs of links; said friction element having a shouldered projection above the central plane thereof in the region of its greatest width under which the links lie in engaging position and said shouldered portion being less in width than the greatest width of the friction element, pivotal connections for the ends of said links including shouldered members between which the ears at one end of each pair of links is clamped, means serving to maintain said shouldered members in their engaging position and clamping the links against the shouldered projection of the friction element, and means for clamping the opposite ends of a pair of adjacent links with respect to the first-mentioned links.

2. A power transmission belt comprising links with apertured end ears arranged in pairs; said eared ends being offset inwardly with respect to the central portion of the links and the latter being arranged in parallel relation and providing with the shouldered portions a substantially rectangular space, a wedge-shaped friction element of rectangular contour in plan detachably supported in said rectangular space; said friction element having a shouldered projection above the central plane thereof in the region of its greatest width under which the links lie in engaging position and said shouldered portion being less in width than the greatest width of the friction element, pivotal connections for the ends of said links including a split sleeve with shoulders between which the ears at one end of each link is clamped, a filler member fitting said split sleeve and serving to maintain said shouldered split sleeve in clamping position, and means for clamping the opposite ends of a pair of adjacent links with respect to said filler member.

3. In a structure as set forth in claim 2, links having oval ears with oval apertures, an oval filler member fitting the shouldered split sleeve and holding the same in spacing and clamping position, and a connecting pin holding the ears of an adjacent pair of links in clamping position with respect to those engaged by the split sleeve.

4. In a structure as set forth in claim 2, links having oval ears with oval apertures, an oval filler member of anti-friction material fitting the shouldered split sleeve and holding the same in spacing and clamping position, and a connecting pin holding the ears of an adjacent pair of links in spacing and clamping position with respect to the ends of said oval filler member.

5. A power transmission belt comprising a plurality of links with apertured ends arranged in pairs; said eared ends being offset inwardly with respect to the central portions of the links and the latter being arranged in parallel relation and providing with the offset portions substantially rectangular spaces between each pair of links, a plurality of wedge-shaped friction elements rectangular in plan detachably supported in said rectangular spaces; said friction elements having shouldered projections above the central plane thereof in the region of their greatest width with which the central portions of said links engage and said shouldered projections being less in width than the greatest width of the friction elements, pivotal connections for the ends of said links including a split sleeve with shoulders between which the ears at one end of each pair of links is clamped, a filler member filling said split sleeve and maintaining the same in spacing and clamping position, and a connecting pin for clamping the opposite ends of adjacent pairs of links with respect to said filler member; said latter ends having squared apertures and the connecting pin having a squared portion fitting the same.

HUGH WILLIAMSON KELLY.